United States Patent
Pollitt

(10) Patent No.: US 11,268,639 B2
(45) Date of Patent: Mar. 8, 2022

(54) COMPOSITE TUBE CONNECTOR ASSEMBLY

(71) Applicant: Crompton Technology Group Limited, Solihull (GB)

(72) Inventor: Will Pollitt, Kenilworth (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 276 days.

(21) Appl. No.: 16/437,377

(22) Filed: Jun. 11, 2019

(65) Prior Publication Data

US 2019/0390803 A1 Dec. 26, 2019

(30) Foreign Application Priority Data

Jun. 25, 2018 (EP) ..................... 18275091

(51) Int. Cl.
*F16L 23/032* (2006.01)
*F16L 23/08* (2006.01)

(52) U.S. Cl.
CPC ..................... *F16L 23/08* (2013.01)

(58) Field of Classification Search
CPC ......... F16L 23/032; F16L 23/00; F16L 23/04; F16L 23/08; F16L 23/16; F16L 23/162; F16L 23/18; F16L 23/22
USPC ........... 285/405, 416, 337, 336, 367
See application file for complete search history.

(56) References Cited

U.S. PATENT DOCUMENTS

| 4,065,339 | A | * | 12/1977 | Lippert | B29C 57/00 |
| | | | | | 156/149 |
| 4,875,717 | A | | 10/1989 | Policelli | |
| 7,247,213 | B2 | | 7/2007 | Reynolds, Jr. et al. | |
| 8,522,827 | B2 | | 9/2013 | Lazzara et al. | |
| 2008/0001396 | A1 | | 1/2008 | Nish et al. | |
| 2009/0174185 | A1 | * | 7/2009 | Ziu | F16L 9/147 |
| | | | | | 285/367 |
| 2009/0200700 | A1 | | 8/2009 | Marlin et al. | |

FOREIGN PATENT DOCUMENTS

| DE | 2122793 A1 | 11/1972 |
| EP | 2292961 A1 | 3/2011 |
| WO | 9834058 A2 | 8/1998 |

OTHER PUBLICATIONS

Extended European Search Report for International Application No. 18275091.9 dated Jan. 3, 2019, 8 pages.

* cited by examiner

*Primary Examiner* — Aaron M Dunwoody
(74) *Attorney, Agent, or Firm* — Cantor Colburn LLP

(57) ABSTRACT

A composite connector assembly includes first and second tubular members, each constructed from fibre-reinforced polymer and each comprising at least one layer of axial or helical fibre and each comprising an end portion with a clamping surface and an overclamp. The overclamp is arranged to at least partially enclose the end portions of the first and second tubular members and to apply a clamping force to the clamping surfaces so as to connect and hold the first and second tubular members together. In each end portion, the at least one layer of axial or helical fibre is diverted radially outwards. Each end portion may have a fibre redirecting member formed underneath the axial or helical fibre which serves to divert the axial or helical fibre radially outwards.

15 Claims, 5 Drawing Sheets

COMPOSITE TUBE CONNECTOR ASSEMBLY

FOREIGN PRIORITY

This application claims priority to European Patent Application No. 18275091.9 filed Jun. 25, 2018, the entire contents of which is incorporated herein by reference.

TECHNICAL FIELD

The present disclosure relates to composite tubes and an assembly for connecting composite tubes.

BACKGROUND

Fluid transfer conduits, such as aircraft fuel pipes, are manufactured conventionally from metal. However, to save weight, fluid transfer conduits are increasingly being manufactured from composite materials such as fibre reinforced polymer (FRP). In aerospace applications (amongst many others), weight savings are highly desirable and so it is beneficial to utilise these composite conduits wherever possible, in place of heavier metal alternatives.

In many applications of fluid transfer conduits, it is required to connect two conduits together, and to seal the connection so as to ensure efficient fluid flow between the two conduits. This is often achieved with bolted connections, wherein two tubular conduits are provided with end fittings having disc-like flanges emanating perpendicularly therefrom (or provided directly on the end of each conduit). These flanges are then pressed together (often with an elastomer O-ring sandwiched in between), before bolts passing through both flanges are used to secure the two together. However, metal end fittings are heavy, and when composite end fittings or flanges are formed, this approach can lead to large localized stresses (e.g. around the bolts and at the join between the flanges and the main body of the conduit), and as such is not suited for conduits constructed from composite materials. An alternative approach is required.

SUMMARY

From a first aspect of the present disclosure, there is provided a composite connector assembly comprising: first and second tubular members, each constructed from fibre-reinforced polymer and each comprising at least one layer of axial or helical fibre and each comprising an end portion with a clamping surface; and an overclamp, which is arranged to at least partially enclose the end portions of the first and second tubular members and to apply a clamping force to the clamping surfaces so as to connect and hold the first and second tubular members together. In each end portion, the at least one layer of axial or helical fibre is diverted radially outwards.

Thus a composite connector assembly is disclosed that can effectively and securely connect two composite tubular members without the use of conventional flanges or bolts. It will be appreciated that the assembly of the present disclosure suffers fewer localised stresses and can thus form a secure connection between two composite tubes.

Each end portion may have a fibre redirecting member formed underneath the axial or helical fibre which serves to divert the axial or helical fibre radially outwards. This fibre redirecting member may be formed from any suitable material and may be a pre-formed ring that is mounted on the mandrel before laying the axial or helical fibre. In preferred examples the fibre redirecting member is formed from hoop fibre, i.e. fibre that is circumferentially wound around the mandrel at a high angle to the mandrel axis so as to build up a suitable profile before laying the axial or helical fibre over the top. Thus the fibre redirecting member is formed before laying the axial or helical fibre and thus serves to redirect the axial or helical fibre radially outwardly in the end portion. Forming the fibre redirecting member from hoop fibre gives strength to the overall structure as well as allowing the hoop fibre and axial/helical fibre parts to be cured together.

Each end portion may therefore comprise both circumferential (high angle or "hoop") fibre and axial or helical (low angle) fibre reinforcement. Because the axial fibre extends out of the end portion and into the main tube (i.e. it is continuous from the main portion into the end portion), it helps the end portion to resist shear stresses associated with the clamping force and/or any forces acting to separate the tubular members (e.g. due to high pressure fluid flowing through the tubular members).

Each end portion may further comprise an additional layer of circumferential (hoop) fibre laid on top of the at least one layer of axial or helical fibre. As will be explained in more detail below, the additional circumferential layer may be used to increase the diameter of the end portion to enable a steeper clamping surface to be formed. The fibre redirecting member (e.g. the inner layer of hoop fibre) is preferably formed as a ramp that increases in diameter towards the end of the tubular member, thus providing the taper of the clamping surface. The axial or helical fibre is then laid over the hoop ramp in substantially uniform thickness, thereby maintaining the shape of the ramp. This causes the axial or helical fibre layer to flare outwardly towards the end of the tubular member. Additional hoop fibre laid on top of the axial or helical fibre may change the angle or shape of the clamping surface from the angle of the underlying hoop ramp. In preferred examples, the hoop ramp has a lower angle with respect to the axis of the tube so as to facilitate laying (or winding) of axial (or helical) fibre over the ramp. The additional hoop fibre may then be used to create a clamping surface (i.e. tapered outer surface of the end portion) with a higher angle with respect to the axis of the tube. This higher angle clamping surface increases the amount of force that the overclamp applies parallel to the axis of the tubes to clamp the tubes together.

In some examples, the at least one layer of axial or helical fibre is diverted radially outwards to a radius that is greater than a radius of the main portion of the respective tubular member. This ensures that the component of clamping force applied to the clamping surfaces parallel to the axes of the tubular members is applied through at least some of the fibres of the at least one layer of axial or helical fibre, thus clamping those fibres within the clamping member. This reduces the chance that the clamping member will shear outer layers of fibre off inner layers of fibre.

The end portion of each tubular member may comprise an outer surface that transitions from a first diameter to a second, larger diameter as it approaches an end of the tubular member, thus providing the clamping surface. The clamping surface at least partially faces away from the end of the tubular member.

Each of the end portions may comprise a substantially planar facing surface at the end of the tubular member. The tubular members are preferably positioned such that their facing surfaces are opposite and aligned. The clamping force provided by the overclamp thus serves to bias the facing surfaces towards each other.

The clamping surfaces are preferably annular surfaces and are preferably formed so as to have a diameter that decreases away from an end of each tubular member, forming a reverse-taper on each end portion, i.e. so that the outer surface of each tube diverges towards the end of the tube. The outer surface may form a partial cone, wider at the end and narrowing away from the end. This can enable a radial clamping force from the overclamp to produce axial forces which press the two tubular members together.

The overclamp may be metal (e.g. steel or aluminium). However preferably the overclamp is constructed from a fibre-reinforced polymer. The use of a composite overclamp can reduce the weight of the connector assembly and avoid galvanic corrosion which may occur when a metal overclamp is used in pipes with an electrically conductive layer such as in fuel pipes in aircraft. In addition, by constructing both the tubular members and the overclamp from composite material, the coefficient of thermal expansion of the overclamp may be more closely matched to that of the tubular members, increasing the temperature range across which the connector assembly can operate.

The overclamp is preferably substantially annular and extends around substantially an entire circumference of the tubular member, ensuring even application of the clamping force to the clamping surfaces.

The composite connection assembly of the present disclosure is suitable for many different applications, for example those in which the first and second tubular members comprise force transmission members (e.g. as part of a linear actuator). However, in preferred examples the first and second tubular members comprise fluid transfer conduits (e.g. fuel pipes).

A taper gradient of the clamping surface of the end portions may be constant, i.e. the diameter of the tube's outer surface which forms the clamping surface may decrease at a constant rate as it extends away from the end of the tubular member. In this case the clamping surface will have a linear cross section. However, in some examples, the cross section of the clamping surface may be curved, i.e., the gradient of the clamping surface may vary as it extends away from the end of the tubular member.

Holding the first and second tubular members together may require a significant force, e.g. if the tubular members are configured to convey high pressure fluid as part of a fuel system. In such an example, if the force provided by the clamp is too small, the tubular members may separate, causing fuel to leak out.

The angle at which the clamping surface is tapered can influence the strength of the connection. A clamping surface with a shallow taper (i.e. lower angle to the tube axis), for example, would require a large clamping force to be applied to produce a required axial connecting force. However, a very steep taper (higher angle to the tube axis) can result in areas of increased stress when the clamping force is applied and can also reduce the axial connecting force produced by the clamping force, increasing the risk of failures. The clamping surface of the end portion preferably therefore comprises a section with a gradient of 30° or more, preferably of 45° or more and further preferably of 60° or more. Preferably the clamping surface of the end portion comprises a section with a gradient of 80° or less. In examples which include a fibre redirecting member (e.g. a hoop ramp), the redirecting member is preferably tapered at an angle of at least 10°, preferably at least 20° and in some examples at least 30°.

The clamping surface of the first tubular member is preferably identical to that of the second tubular member (i.e. making the connection symmetrical). The clamping surfaces of the first and second tubular members preferably extend to a common maximum diameter. This maximum diameter preferably occurs at the end of each tubular member. When the two tubes are abutted against one another, the tapered clamping surfaces together form a bulge (raised portion) around the joint.

The overclamp may comprise two or more separate portions which are tightened around the end portions of the tubular members, e.g. by a split clamp joined by one or more threaded bolts. The overclamp preferably comprises a spring-type or screw-type clamp. The overclamp is preferably arranged to provide a force in a plane perpendicular to the axis of the tube (e.g. along a radius of the tube). The tapered clamping surfaces then redirect part of that force to axial forces that press the two tubular members together.

The overclamp may comprise a thermoplastic polymer, such as such as polyamide (nylon), polypropylene, ABS or polyether ether ketone (PEEK). Alternatively, the overclamp may comprise a thermosetting polymer, for example polyester, epoxy or a phenolic resin.

The overclamp preferably comprises an inner surface, having a shape that corresponds to the clamping surfaces of the two tubular members, by which the overclamp engages with the end portions of the tubular members. The inner surface may comprise a similar and preferably complementary cross sectional profile to that which the two clamping surfaces make when brought together to form the connector assembly. This optimises the application of clamping force by the overclamp.

The connector assembly may comprise an elastomer O-ring positioned between the first and second tubular members. In such examples, when the first and second tubular members are held together by the overclamp, the O-ring is compressed between the tubular members, sealing the connection. The O-ring may be positioned in a circumferential groove cut into a facing surface of one or both end portions. This helps to hold the O-ring in place during assembly and use and can improve the seal quality achieved.

The first tubular member may have a constant inner diameter (i.e. across both the main portion and the end portion). In such an example the end portion of the first tubular member comprises an increasing wall thickness towards the end of the tubular member. Similarly, the second tubular member may comprise a constant inner diameter. The inner diameters of the first and second tubular members may be equal. In examples where the tubular members comprise fluid transfer members having equal inner diameters reduces the possibility of turbulent or restricted fluid flow through the connection.

As will be explained in more detail below, during manufacture it may be required to machine (i.e. remove material from) the connector assembly, potentially exposing the fibre reinforcement on one or more surfaces of the connector assembly. In such examples, the completed connector assembly may comprise a gel coat. This may comprise a low-viscosity resin coating. A gel coat can help to prevent moisture ingress through and improve the appearance of machined surfaces.

Viewed from an alternative perspective, the present disclosure provides a composite connector assembly, comprising: a first tube having an end portion at an end thereof; a second tube having an end portion at an end thereof. The first tube and the second tube are disposed such that the end portions are adjacent to each other and each end portion tapers such that it widens towards the end of its respective tube. The assembly further comprises an overclamp engaged with the end portion of the first tube and with the end portion of the second tube such that it biases the first tube and the second tube together. Each of the first tube and the second tube comprises a layer of axial or helical fibre that flares radially outwards in the respective end portion.

It will be appreciated that the preferred features described above may also be applied to this alternative perspective of the disclosure.

The present disclosure extends to a method of joining two composite tubular members comprising: providing two tubular members each formed from fibre-reinforced polymer, and each comprising at least one layer of axial or helical fibre and each comprising an end portion with a clamping surface, wherein in each end portion, the at least one layer of axial or helical fibre is diverted radially outwards; arranging said tubular members such that their end portions are adjacent; and applying an overclamp such that the overclamp at least partially encloses the end portions of the first and second tubular members and applies a clamping force to the clamping surfaces so as to connect and hold the first and second tubular members together.

Manufacturing the two tubular members may comprise winding reinforcing fibres, pre-impregnated with a thermosetting or thermoplastic polymer, around a mandrel. In such examples a small amount of circumferentially oriented (hoop) fibre may first be wound onto the mandrel and then axial or lower angle fibre laid on top of this to form a tube comprising a raised portion which will become the end portion of the resultant tubular member. As discussed above, the underlying layer of hoop fibre may be formed as a ramp with diameter increasing towards the end of the tubular member.

The two tubular members may be formed simultaneously, by winding reinforcing fibres onto a single mandrel to form a single tube featuring a central raised portion, which will become the end portions of the tubular members. The tube may then be cut through the central raised portion to form the two tubular members.

The method may further comprise winding additional circumferential fibre on top of the at least one layer of axial or helical fibre. This may be used to increase the diameter of the end portion and enable a steeper clamping surface to be formed.

The method may comprise removing material from the tubular members. For example, material may be cut or milled away to form a planar facing surface and/or a precise profile of clamping surface as may be required for a particular application. Preferably, no axial or low angle helical fibres are severed when the material is removed, as severing axial fibre can reduce the ability of the finished connector to resist axial shear stresses. Thus in some examples only circumferential (high angle, hoop) fibre is removed to form the clamping surface. As mentioned above, in some examples a groove may be cut into an end face of each tubular member in which an O-ring may be positioned to seal the connection.

The method may comprise curing the tubular members.

Applying the overclamp may comprise tightening two or more separate portions of the overclamp onto the tubular members (e.g. by rotating a threaded bolt linking two halves of a split clamp).

According to a further aspect of the present disclosure there is provided a tubular member includes a main portion and an end portion. At least one layer of axial or helical fibre extends from the main portion into the end portion. The end portion is of wider outer diameter than the main portion and has an inner layer of circumferentially oriented fibre-reinforcement positioned radially inside the at least one layer of axial or helical fibre, and an additional layer of circumferential oriented fibre reinforcement positioned radially outside of the at least one layer of axial or helical fibre.

It will be appreciated that all of the preferred features of the tubular member described above in relation to the composite connector assembly may also apply to this further aspect of the disclosure.

The tubular member may, of course, comprise further fibre reinforcement beyond the inner layer, the at least one layer of axial or helical fibre and additional layers. For example, the tubular member may comprise further circumferential fibre-reinforcement in the main portion to increase hoop strength.

It will be appreciated that the term "hoop fibre" or "circumferential fibre" is used here to mean fibre that has a high angle with respect to the axis of the tubular member. In practice, fully circumferential fibre (an angle of 90°) is rarely useful, but such high angle fibre typically has an angle of at least 80°, more preferably at least 85° and often as high as 89° to the axis of the tubular member. By contrast, axial fibre can be laid by some fibre placement techniques exactly parallel to the axis (an angle of 0°), although in filament winding techniques it is more usual to use low angle helical wound fibre to provide axial strength. Such low angle helical fibre typically has a winding angle (i.e. an angle to the axis of the tubular member) of no more than 60°, more preferably no more than 45° and may be as low as 8°.

Figure 1:
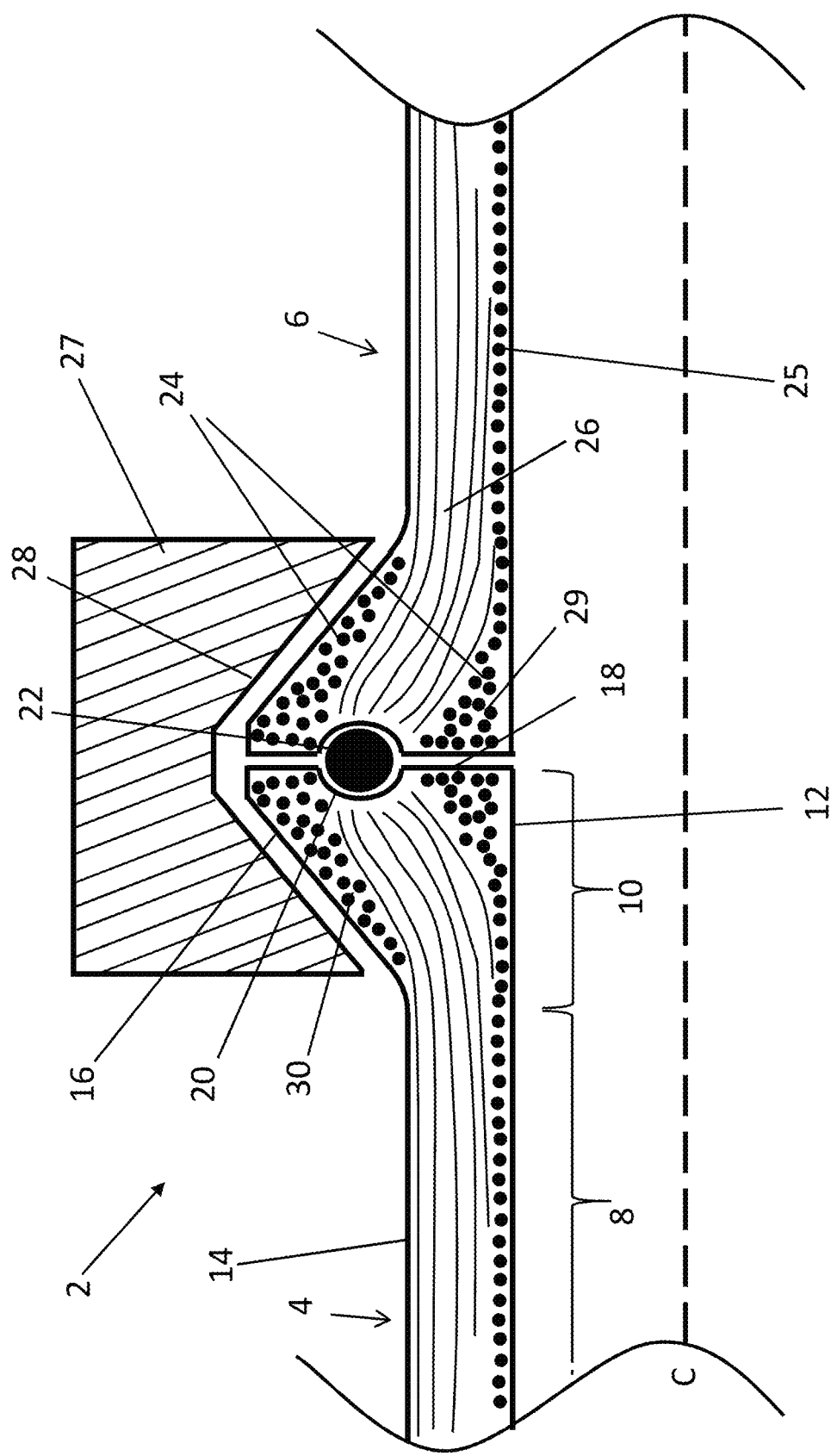
FIG. 1 shows a cross sectional view of a composite connector assembly according to an example of the present disclosure.

The connector assembly 2 comprises a first tubular member 4 and a second tubular member 6, both of which have rotational symmetry about a central axis C. Each of the tubular members 4, 6 comprises a main portion 8 and an end portion 10. The tubular members 4, 6 are arranged such that the end portions 10 are adjacent and aligned.

DETAILED DESCRIPTION

Each tubular member 4, 6 comprises an internal diameter 12, which is constant through the main portions 8 and the end portions 10. The main portions 8 also comprise a constant outer diameter 14. The end portions 10, however, each comprise a reverse-tapered outer diameter 16, which widens towards the respective ends of the tubular members 4, 6 so that the overall surface of the tubular members 4, 6 is flared outwards (i.e. diverges towards the end).

The end portions 10 each comprise a planar end face 18 which is perpendicular to the central axis C. The arrangement of the tubular members 4, 6, is such that the end faces 18 of the end portions 10 are aligned and parallel. Each end face 18 comprises a groove 20. An elastomer O-ring 22 is trapped between the tubular portions 4, 6, held in position by the grooves 20.

An overclamp 27 is positioned over end portions 10 and is tightened to provide a radially inward clamping force to the end portions 10 (although for clarity purposes the overclamp 27 of FIG. 1 is not shown in contact with the end portions 10). The overclamp 27 comprises an inner surface 28 which has a profile which matches that of the reverse-tapered outer diameters 16. This ensures a uniform and consistent application of clamping force. The reverse-tapered shape of the outer diameters 16 converts the radial clamping force to an axial force which holds the tubular members 4, 6 together. This force causes the end faces 18 to compress the elastomer O-ring 22 and seal the connection.

The first and second tubular members 4, 6 are constructed from FRP (e.g. thermosetting polymer reinforced with glass fibres). As shown in FIG. 1 the first and second tubular members 4, 6 comprise both circumferentially-oriented (hoop) fibre reinforcement 24 and axially-oriented (axial) fibre reinforcement 26. The end portions 10 are mostly composed of hoop fibre 24, which provides the end portion 10 with a high level of circumferential strength and can also aid manufacture, as explained in more detail below with reference to FIGS. 2 and 3. An underlying layer of hoop fibre 24 forms a ramp or wedge shape 29 that increases in diameter towards the end of the tubular members 4, 6. The axial (or low angle helical) fibre 26 laid over the top of this hoop ramp 29 follows the angle of the ramp so that the axial/helical fibres 26 are splayed outwardly towards the ends of the tubular members 4, 6. Additional hoop fibre 24 provided as an outer layer 30 increases the overall diameter of the end portion 10 and may be shaped to form a more ideal clamping surface (i.e. for better engagement with the overclamp 27), e.g. by increasing the angle of the taper or profiling for correspondence with the internal shape of the overclamp 27.

The main portions 10 of the tubular members 4, 6 also comprise a layer of circumferential (hoop) fibre 25, to provide the tubular members 4, 6, with high hoop strength (e.g. to enable them to carry fluid at high pressures).

The hoop fibre of the inner layer 25, the hoop ramp 29 and the outer layer 30 in this example are wound with a winding angle of at least 85°. The axial-oriented fibre reinforcement 26 is wound with a winding angle of no more than 45° (although it will be appreciated that these winding angles are not limiting and other angles could be used instead).

It can be seen in FIG. 1 that the axially-oriented fibre 26 is diverted radially outwardly by the hoop ramp 29 so that the axial fibres extend to a radius greater than that of the outer diameter of the main portion 8 of the tubular members 4, 6. The axially-oriented fibre 26 is thus disposed between the two inner clamping surfaces 28 of the overclamp 27 such that the axial force applied by the overclamp 27 is applied through the radially diverted, axially-oriented fibre 26, thus trapping and holding the axially-oriented fibre 26 inside the overclamp 27.

In this example, the overclamp 27 comprises a thermoplastic polymer reinforced with chopped fibres, although other constructions may alternatively be used.

Figure 2:
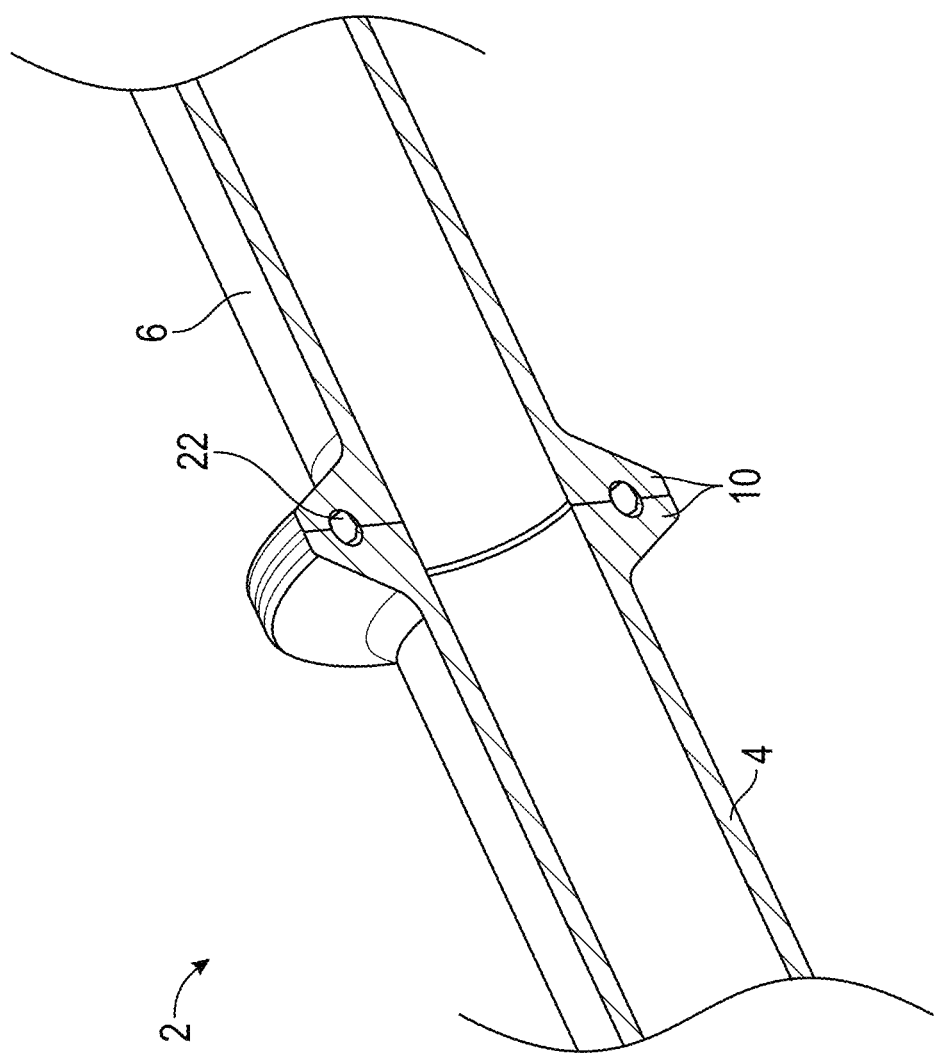
FIG. 2 shows a cross-sectional perspective view of a part-assembled composite connector assembly.
Figure 3:
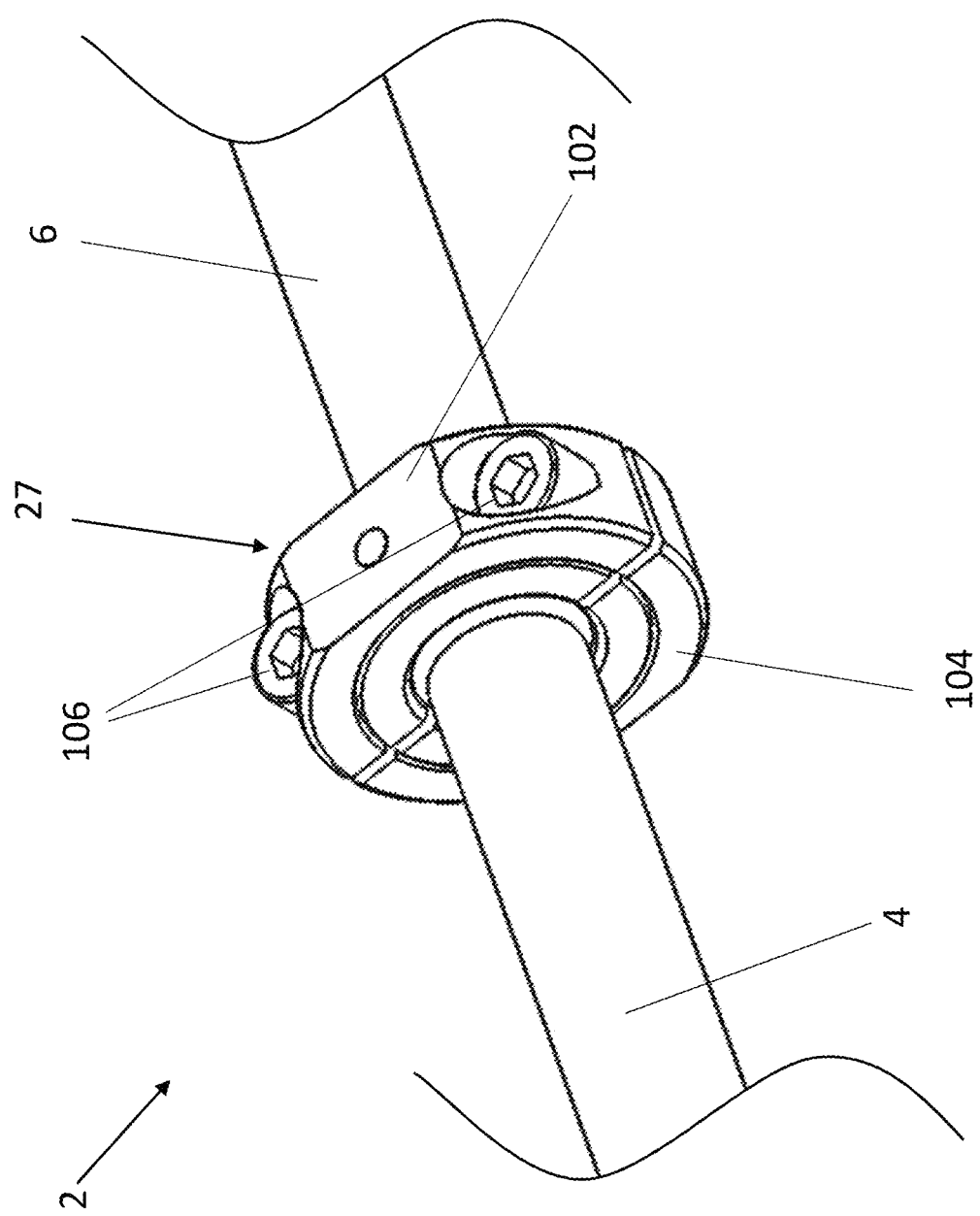
FIG. 3 shows a perspective view of a fully assembled composite connector assembly.
Figure 4:
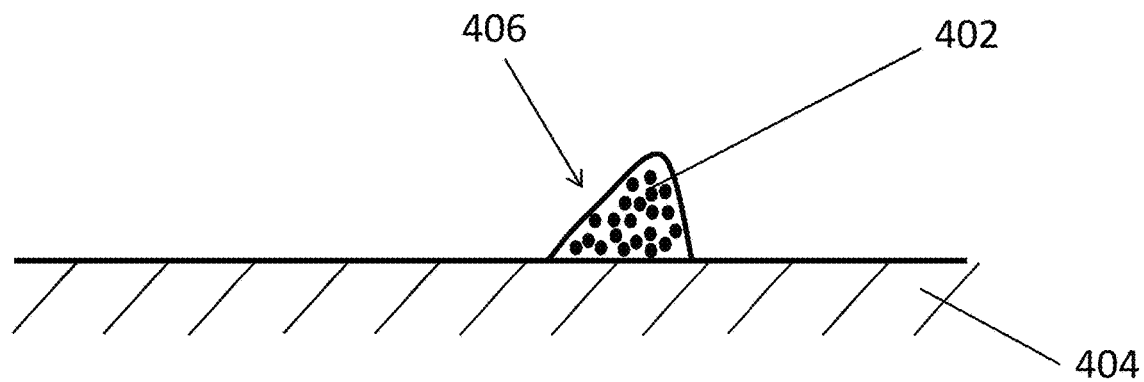
FIGS. 4-7 show various steps in a method of manufacturing a composite tubular member.

FIG. 2 shows a cross-sectional view of the connector assembly 2 part way through assembly with the two hollow tubular members 4, 6 abutted against each other, but before the overclamp 27 has been applied. FIG. 3 shows the connector assembly 2 when fully assembled, i.e. with the overclamp 27 applied over the two end portions 10.

As explained above, the first and second tubular members 4, 6 are connected and held together by the overclamp 27. To assemble the connector assembly 2, the end portions 10 of the first and second tubular members 4, 6 are first brought together, with the O-ring 22 trapped therebetween, as shown in FIG. 2.

As shown in FIG. 3, the overclamp 27 comprises a first portion 102 and a second portion 104, which are both roughly semi-circular in cross section. The connector assembly 2 is assembled by bringing first and second portions 102, 104 of the overclamp 27 together around the adjacent end portions 10. Two bolts 106 running between the first portion 102 and the second portion 104 are then tightened. This holds the first and second portions 102, 104 together and provides the clamping force to the connector assembly 2, connecting and holding the first and second tubular members 4, 6 together. The radial force provided by tightening bolts 106 against the angled (tapered) outer diameters 16 of the end portions 10 provides an axial component of force that presses and holds the first and second tubular members 4, 6 together.

A method of manufacturing one of the tubular members will now be described with reference to FIGS. 4-7.

Figure 5:
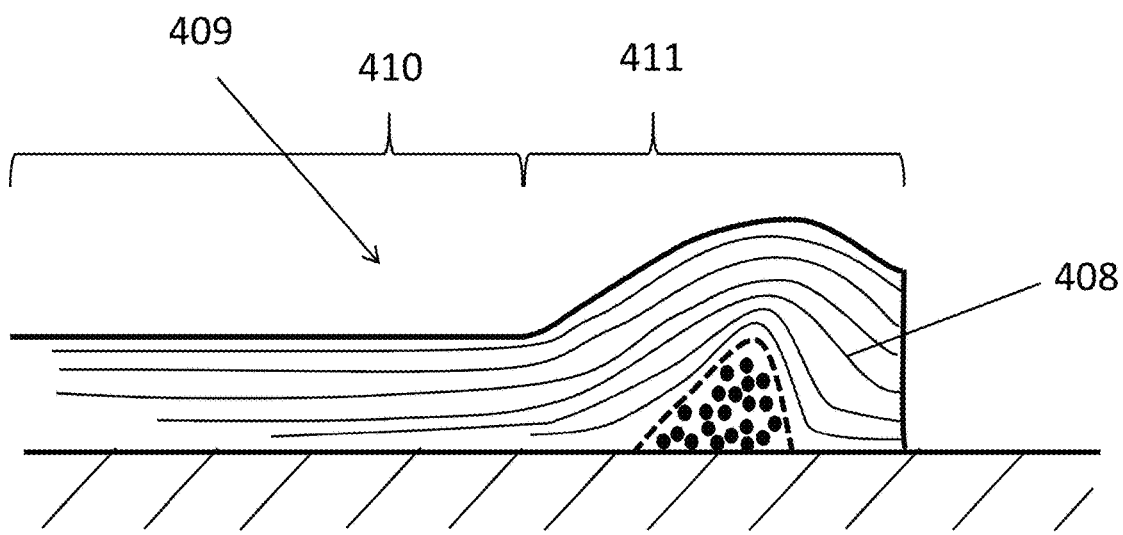

Firstly, fibre reinforcement 402 is wound circumferentially around a mandrel 404 to form a hoop ramp 406. This hoop fibre is typically wound with an angle of greater than 85° to the mandrel axis (i.e. the tube axis). As seen in FIG. 5, a secondary layer of axial (or helical) fibre 408 is then laid on or wound around the mandrel 404 and over the hoop ramp 406 to form a tubular member 409 with a main portion 410 and a bulbous end portion 411. The main portion 410 also comprises circumferential fibre but it is not shown here for reasons of clarity. The axial or helical fibre 408 is typically wound with an angle of no more than 45° to the mandrel axis (i.e. the tube axis).

Figure 6:
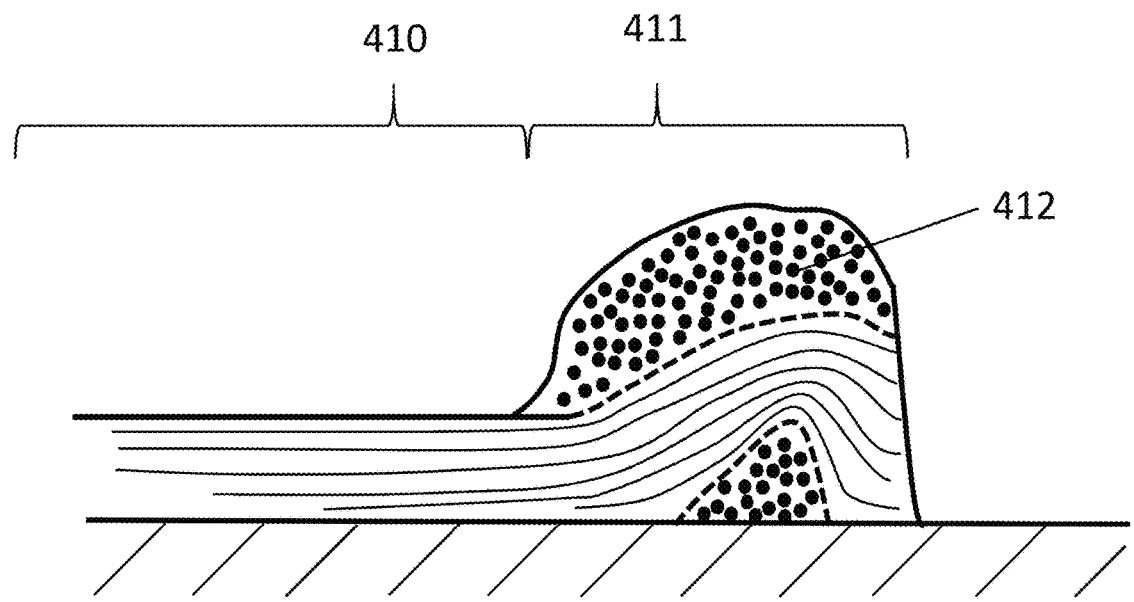

FIG. 6 shows how a further layer of circumferential fibre 412 is then wound over axial fibre 408 in the end portion 411 to increase the diameter of the end portion 411.

Figure 7:
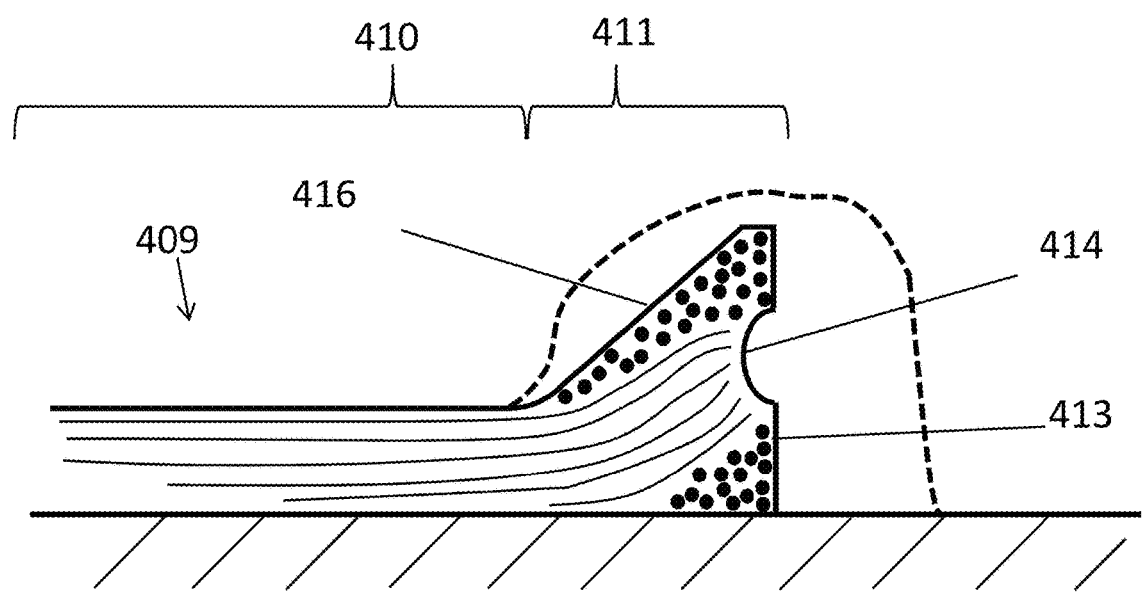

Finally, as seen in FIG. 7, material is removed from the tubular member 409 in a machining process (e.g. using a lathe or a mill). Material is removed from the end portion 411 to form an end surface 413, a groove 414 and a tapered clamping surface 416. The tapered claiming surface 416 is formed by removing only circumferential fibre 412 in the outer layer. No axial fibre 408 in the secondary layer is severed in the formation of the tapered clamping surface 416, thus maintaining the axial strength of the tubular member 409 and its associated resistance to shear stresses.

The invention claimed is:

1. A composite connector assembly comprising:
   first and second tubular members, each constructed from fibre-reinforced polymer and each comprising at least one layer of axial or helical fibre and each comprising an end portion with a clamping surface; and
   an overclamp, which is arranged to at least partially enclose the end portions of the first and second tubular members and to apply a clamping force to the clamping surfaces so as to connect and hold the first and second tubular members together;
   wherein in each end portion, the at least one layer of axial or helical fibre is diverted radially outwards; and
   each end portion comprises an inner layer of circumferentially oriented fibre-reinforcement positioned radially inside the at least one layer of axial or helical fibre and an additional layer of circumferentially oriented fibre reinforcement positioned radially outside of the at least one layer of axial or helical fibre.

2. The composite connector assembly as claimed in claim 1, wherein each end portion has a fibre redirecting member formed underneath the axial or helical fibre which serves to divert the axial or helical fibre radially outwards.

3. The composite connector assembly as claimed in claim 1, wherein the at least one layer of axial or helical fibre is diverted radially outwards in each end portion to a radius that is greater than a radius of a main portion of the respective tubular member.

4. The composite connector assembly as claimed in claim 1, wherein the first and second tubular members comprise fluid transfer conduits.

5. The composite connector assembly as claimed in claim 1, wherein the end portion of each tubular member comprises an outer surface that transitions from a first diameter to a second, larger diameter as the outer surface approaches an end of the tubular member.

6. The composite connector assembly as claimed in claim 1, wherein the clamping surface comprises a linear cross section.

7. The composite connector assembly as claimed in claim 1, wherein the clamping surface of the end portion comprises a section with a gradient of at least 45°.

8. The composite connector assembly as claimed in claim 1, wherein the clamping surface of the first tubular member is substantially identical to that of the second tubular member.

9. The composite connector assembly as claimed in claim 1, wherein the overclamp comprises two or more separate portions tightened around the end portions of the tubular members.

10. The composite connector assembly as claimed in claim 1, further comprising an elastomer O-ring positioned between the first and second tubular members in a circumferential groove cut into a facing surface of one or both end portions.

11. The composite connector assembly as claimed in claim 1, wherein each tubular member comprises:
a main portion and an end portion;
wherein at least one layer of axial or helical fibre extends from the main portion into the end portion and the end portion is of wider outer diameter than the main portion.

12. The composite connector assembly as claimed in claim 1, wherein the clamping surface of the end portion comprises a section with a gradient of 80° or less.

13. A method of joining two composite tubular members comprising:
providing two tubular members each formed from fibre-reinforced polymer, and each comprising at least one layer of axial or helical fibre and each comprising an end portion with a clamping surface, an inner layer of circumferentially oriented fibre-reinforcement positioned radially inside the at least one layer of axial or helical fibre and an additional layer of circumferential oriented fibre reinforcement positioned radially outside of the at least one layer of axial or helical fibre, wherein in each end portion, the at least one layer of axial or helical fibre is diverted radially outwardly;
arranging said tubular members such that their end portions are adjacent; and
applying an overclamp such that the overclamp at least partially encloses the end portions of the first and second tubular members and applies a clamping force to the clamping surfaces so as to connect and hold the first and second tubular members together.

14. The method of joining two composite tubular members as claimed in claim 13, further comprising removing material from the tubular members.

15. The method of joining two composite tubular members as claimed in claim 13, wherein applying the overclamp comprises tightening two or more separate portions of the overclamp onto the tubular members.

* * * * *